United States Patent [19]

Hu

[11] Patent Number: 5,767,406

[45] Date of Patent: Jun. 16, 1998

[54] METHOD TO SPECIFY RANDOM VIBRATION TESTS FOR PRODUCT DURABILITY VALIDATION

[75] Inventor: Jun Ming Hu, Canton, Mich.

[73] Assignee: Ford Motor Company, Dearborn, Mich.

[21] Appl. No.: 724,718

[22] Filed: Sep. 30, 1996

[51] Int. Cl.$^6$ .................................................. G01M 7/02
[52] U.S. Cl. ........................ 73/578; 364/508; 364/468.16
[58] Field of Search ........................... 73/578, 652, 664,
73/789, 662; 340/683; 364/508, 552, 554.1, 468.16, 551.01

[56] References Cited

U.S. PATENT DOCUMENTS

| | | |
|---|---|---|
| 3,710,082 | 1/1973 | Sloane et al. |
| 5,012,428 | 4/1991 | Ueno et al. |
| 5,047,947 | 9/1991 | Stump |
| 5,179,860 | 1/1993 | Tsuboi |
| 5,270,957 | 12/1993 | Murray |
| 5,278,495 | 1/1994 | Beaton et al. |
| 5,282,150 | 1/1994 | Yamada |
| 5,291,419 | 3/1994 | Satoh et al. |
| 5,299,459 | 4/1994 | Underwood |
| 5,301,118 | 4/1994 | Heck et al. |
| 5,565,618 | 10/1996 | Hu ............................................. 73/662 |

OTHER PUBLICATIONS

"Role fo Failure–Mechanism Identification in Accelerated Testing", by J.M. Hu, D. Barker, A. Gasgupta and A. Arora, Journal of the IES. Jul./Aug. 1993, pp. 39–46.

"Physics–of –Failure–Based Reliabilty Qualification of Automotive Electronics", by J.M. Hu, Communications in RMS, Jul. 1994, pp. 21–33.

"Life Prediction and Acceleration Based on Power Spectral Density of Random Vibration", by J.M. Hu, Proceedings–Institute of Environmental Sciences, 1994, pp. 60–68 (no month).

"Test–Time Compression for Qualification Testing of Electronic Packages: a Case Study", by T.P. Rothman, A. Gasgupta and J.M. Hu, 1995 Proceedings Annual Reliability and maintainability Symposium, pp. 246–252 (no month).

*Primary Examiner*—Christine K. Oda
*Attorney, Agent, or Firm*—Richard D. Dixon

[57] ABSTRACT

A method for determining the testing profile for accelerated laboratory random vibrational testing of a product, including the steps of (i) selecting the frequency range covered in the laboratory accelerated testing, (ii) developing a simplified composite Power Spectral Density function $PSD_j$ (f) representative of the PSD for random vibration loadings in expected field vibration levels, (iii) developing the shape of $PSD_T$ for producing on the product the test acceleration forces corresponding to the $PSD_j$ function, (iv) calculating the stress response curve H(f) for the product representative of the transmissibility function from the input acceleration forces to the local vibration stress forces, (v) selecting the test duration, and then calculating the amplification factor from the relationship $$AF = \frac{\Sigma M_i N_i \int_{f_{min}}^{f_{max}} PSD_{g,i}(f) H^2(f) df}{\int_{f_{min}}^{f_{max}} PSD_j(f) H^2(f) df} T^{\frac{2}{m}}$$

(vi) recalculating the accelerated PSD profile, $PSD_T$ (f) for testing based on the selected test duration and the amplification factor:

$$PSD_T(f) = \begin{cases} a_1 AF PSD_p & 5\text{Hz} < f < 20\text{Hz} \\ a_1 AF PSD_p & 20(j-1)\text{Hz} < f < 20(j)\text{Hz} \end{cases} \quad j=2,3,\ldots 10$$

, and then (vii) testing the product using the selected PSD function, to validate the required performance lifetime for the product when no test failures are observed over all of the T hours.

20 Claims, 5 Drawing Sheets

METHOD TO SPECIFY RANDOM VIBRATION TESTS FOR PRODUCT DURABILITY VALIDATION

BACKGROUND OF THE INVENTION

1. Field of the Invention

The present invention relates to a method for validating the operational durability of an automotive component product based upon accelerated laboratory random vibration tests employing the principles of physics-of-failure and damage correlation.

2. Description of the Prior Art

In the automotive industry, sinusoidal vibration testing is frequently used due to the low equipment cost and convenience. However, the random vibration test is more desirable because the vibration loading applied on automotive components during actual operating conditions comprises the combination of several random processes corresponding to several different field driving routes. Therefore, a random vibration test conducted in the laboratory can better simulate field loading conditions. Random vibration tests in product validation process is possible now due to the availability of the random vibration test equipment and facilities.

However, it would be desirable to accelerate the testing time by elevating the random vibration profile in some manner. Most current accelerated testing methods are based on a load analysis approach which evaluates the input load and disregards small amplitude loads, regardless of frequency. This approach may cause significant errors, because failure of a product is a stress driven phenomenon and not load driven. Small amplitudes of load may induce large stresses. A more correct accelerated testing methodology must include the considerations of stress response of the product and material damage properties. This combination can best be implemented using the physics-of-failure approach.

An objective of the present invention is to develop a testing methodology to determine random vibration testing methodologies based on the physics-of-failure and damage equivalence technique such that the vibration damage generated in laboratory testing will be equivalent to the damage induced by random vibration in the field. Based on field random vibration profiles and the desired product life goal, an equivalent random vibration test in a laboratory environment, including the vibration level and test time, may be defined. If a product survives this laboratory test profile, it should survive in the field during the desired life time.

SUMMARY OF THE INVENTION

The present invention describes a method for determining the testing profile for accelerated laboratory sinusoidal vibrational testing of a product, comprising the steps of:

(i) selecting the frequency range to be used in the accelerated laboratory testing, (ii) developing a simplified composite Power Spectral Density function $PSD_f(f)$, including scaling coefficients, representative of the PSD for random vibration loadings in expected field vibration levels, (iii) developing the appropriate profile for $PSD_T(f)$ by using the scaling coefficients, for producing on the product the test acceleration forces corresponding to the $PSD_f(f)$ function, (iv) calculating the stress response curve H(f) for the product representative of the transmissibility function from the input acceleration forces to the local vibration stress forces, (v) selecting the test duration T based on the capabilities of the testing equipment and the testing time available, and then calculating the amplification factor from the relationship $$AF = \frac{M_f/v_i \int_{f_{min}}^{f_{max}} PSD_{g,i}(f)H^2(f)df}{\int_{f_{min}}^{f_{max}} PSD_j(f)H^2(f)df} \; T^{2/m}$$

(vi) recalculating the accelerated PSD profile, $PSD_T(f)$ for testing based on the selected test duration and the amplification factor:

$$PSD_T(f) = \begin{cases} a_1 AF PSD_p & 5Hz < f < 20Hz \\ a_1 AF PSD_p & 20(j-1)Hz < f < 20(j)Hz \end{cases} \quad j = 2,3,\ldots 10$$

, and then (vii) testing the product using the selected PSD function, to validate the required performance lifetime for the product when no test failures are observed over testing time T.

(viii) if the product being tested comprises several different material types, once a failure occurs in the expected material (having material property of m) before T hours, a design change or manufacturing improvement is required. If a failure occurs in an unexpected material (having a different material property of m') before the testing duration of T hours, recalculate the required test duration T' by using the new property m' of the material associated with the failure. The product is then tested for the newly calculated accelerated duration T'.

BRIEF DESCRIPTION OF THE DRAWINGS

Other objects, features and advantages of the invention will be apparent from a study of the written descriptions and the drawings in which.

DEVELOPMENT OF ACCELERATED TESTING ASSUMPTIONS

Estimation of the Damage in the Field

Fatigue damage under random vibration can be estimated based on Miner's rule:

$$D = \int_0^\infty \frac{n(S_A)}{N(S_A)} dS_A = \Sigma_i \frac{n_i(S_A)}{N_i(S_A)} \quad (1)$$

where $n(S_A)$ is the number of cycles applied at stress amplitude level of $S_A$, and $N(S_A)$ is the mean cycles to failure at the applied stress $S_A$. Usually, the relation between $S_A$ and $N(S_A)$ which is called the S-N curve, is expressed by the following formula:

$$N = C \, S_A^{-m} \quad (2)$$

where C and m are material properties for a given temperature, mean stress, and surface condition.

Figure 1:
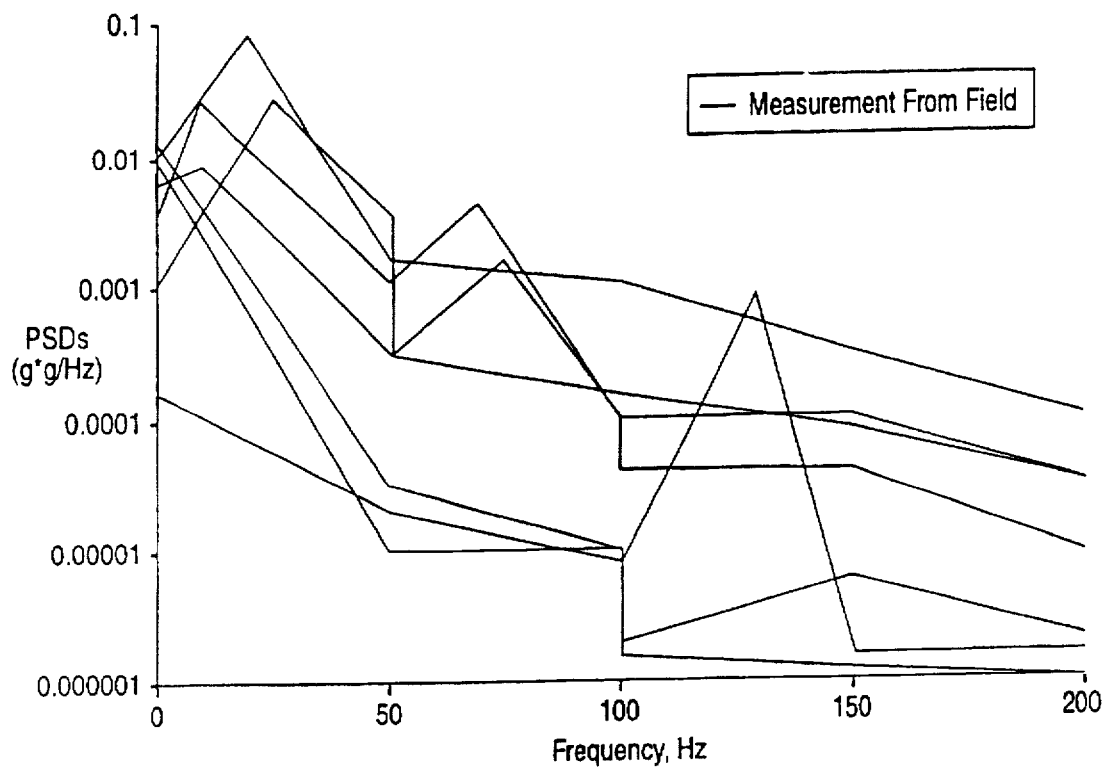
FIG. 1 illustrates an example of PSD curves measured from field data.

Assuming that the random vibrations produced by each road surface in a simulated road testing profile correspond to a stationary Gaussian process or distribution, the total cumulative damage for all field routes can be estimated by the following equation:

$$D_F = \Sigma_i D_i =$$

$$\Sigma_i \frac{3600 M_i f_{o,i} (\sqrt{2})^m \Gamma\left(\sqrt{\frac{m}{2}} + 1\right)}{\lambda_i v_i C} \left\{ \int_{f_{min}}^{f_{max}} PSD_{g,i}(f) H^2(f) df \right\}^{\frac{m}{2}}$$

where $PSD_{g,i}(f)$ is the power spectral density (PSD) function of the field input acceleration, $M_i$ is the operating miles for ith road surface; $V_i$ is the driving speed (in MPH) for measuring Power Spectral Density (PSD); $\Gamma(\cdot)$ is the Gamma function; $l_i$ is the correction factor for bandwidth; and $f_{o,i}$ is the average frequency. $H(f)$ is the stress response function, which is the transmissibility from the input acceleration to the local stress that can be obtained from dynamic stress analysis by using Computer Aided Engineering (CAE) tools; and $f_{min}$ and $f_{max}$ are the lower bound and upper bound of applied frequencies. The boundary is determined so that the values of $PSD_g(f)$ outside of the boundary are less than 0.001 of the peak value. FIG. 1 shows an example of the PSD curves measured during actual field testing.

Estimation of Damage Induce in Laboratory Sinusoidal Testing

In laboratory testing, the total cumulative damage can be estimated by the following equation:

$$D_T =$$

$$\Sigma_i \frac{3600 T f_{o,i} (\sqrt{2})^m \Gamma\left(\sqrt{\frac{m}{2}} + 1\right)}{\lambda_i C} \left\{ \int_{f_{min}}^{f_{max}} PSD_T(f) H^2(f) df \right\}^{\frac{m}{2}}$$

where T is the total testing time in hours; $\Gamma(\cdot)$ is the Gamma function; $l_i$ is the correction factor for bandwidth; $f_{o,i}$ in Equation 5 (?) is the average frequency, and $f_{min}$ and $f_{max}$ are the lower bound and upper bound of applied frequencies. $PSD_T(f)$ is the power spectral density (PSD) function applied to the product during the laboratory testing. $H(f)$ is the stress response function, which is the transmissibility from the input acceleration to the local stress that can be obtained from dynamic stress analysis by using CAE tools.

Damage Equivalence Technique

The previously explained approximations allow the development of a laboratory testing methodology with a defined testing duration so that the damage generated in the laboratory testing with a defined test duration is the same as that generated in the field for the period of desired product life time. That is:

$$D_F(\text{life time}) = D_T(\text{test durtion}) \quad (5)$$

Therefore, from Equations 3 and 4, the required laboratory test levels can be calculated if an appropriate test duration is specified, or the required test duration can be calculated if the appropriate test levels are specified. As a first order approximation, the effect of the correction factor for bandwidth, $l_i$ and the effect of the central frequency $f_{o,i}$ are negligible, the relationship between the lab test duration and the applied PSD level then becomes:

$$T = \frac{\Sigma M_i/v_i \left\{ \int_{f_{min}}^{f_{max}} PSD_{g,i}(f) H^2(f) df \right\}^{\frac{m}{2}}}{\left\{ \int_{f_{min}}^{f_{max}} PSD_T(f) H^2(f) df \right\}^{\frac{m}{2}}} \quad (6)$$

Equation 6 shows that the required test time T is dependent on the fatigue properties of the material and the stress response function (that can be determined by finite element analysis). The product lifetime requirement is reflected in the distance traveled by the vehicle (in miles) for each route, $M_i$.

Determination of Laboratory Test Requirement

In order to correlate the laboratory testing to random vibrations observed in the field, a method to specify the durability test specification may be based on the damage equivalence technique, where the field loading measurement, stress response and the material damage property used as the input variables. The determination of the laboratory test requirements corresponding to typical field environments and lifetime goals include the determination of frequency range covered in the test, the profile/shape (or scaling factor) of the laboratory test profile, the test duration, and the levels of the laboratory test PSD profile. In order to determine these parameters, typical PSDs as measured in the field may be simplified, and the stress response curve of the product may be calculated.

Description of the Preferred Accelerated Testing Method

Based on the assumptions and theory discussed above, a method for determining the vibration test requirements for accelerated product durability verification may be expressed in the following steps:

(i) Select frequency range to be covered in the laboratory testing

The frequency range of the PSD used in the laboratory testing is appropriately selected. The frequency range between 5 Hz to 200 Hz is a good selection for non-engine mounted components subjected to low frequency environment. For components subjected to high frequency environments, such as those mounted near the engine, a frequency range of 5 Hz to 2,000 Hz may be required.

(ii) Simplify the field-measured PSDs

Figure 2:
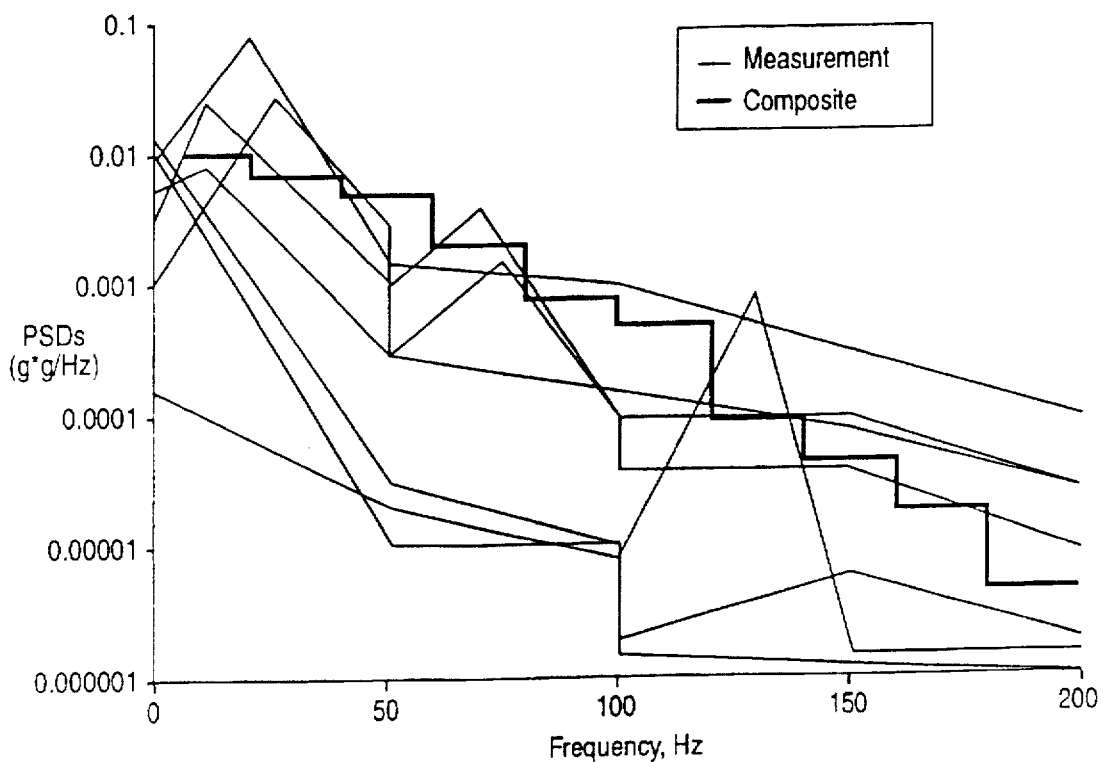
FIG. 2 illustrates an example of the composite PSD curve derived from the PSD curves measured from the field data.
Figure 3:
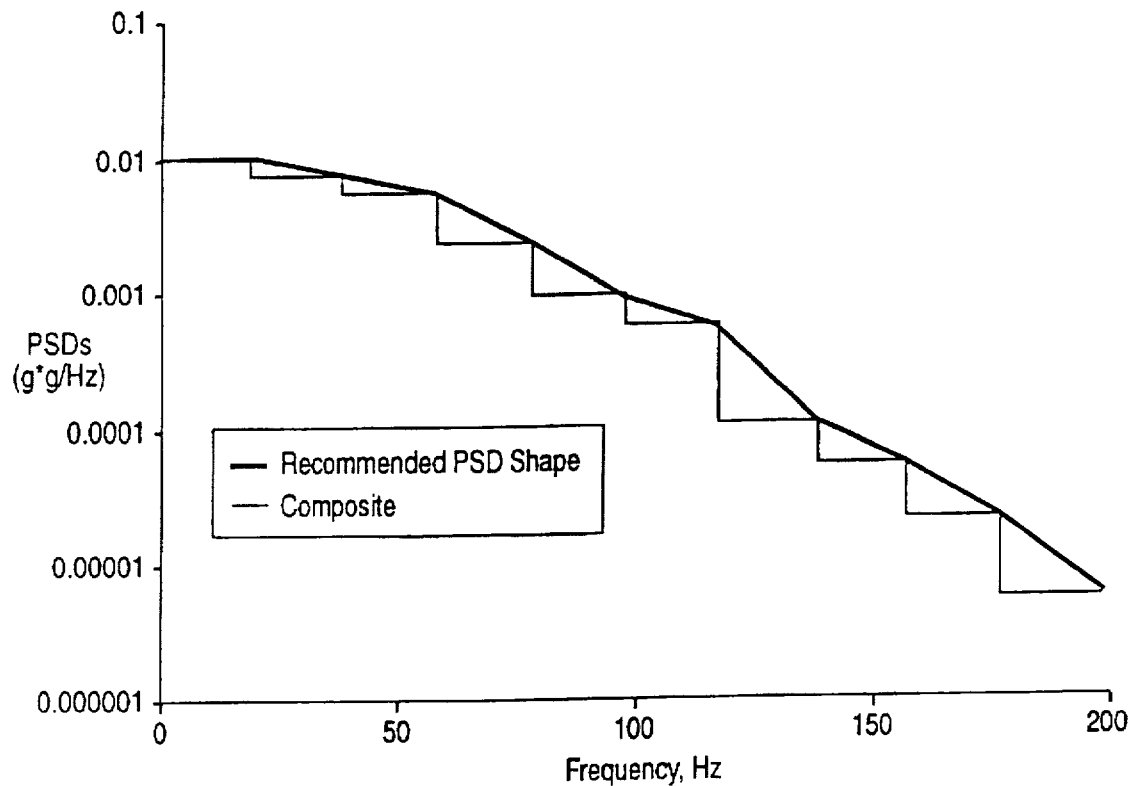
FIG. 3 illustrates an example of the PSD shape or profile used to determine the accelerated laboratory testing.

The field random vibration loadings are the power spectral density (PSD) curves measured for each road surface typically encountered. A composite PSD curve is illustrated in FIG. 3 as representing the typical vehicle vibration environment at a typical product mounting location. The composite PSD curve is derived from PSD data measured in the field and then simplified into a 10-level step function as illustrated by the dark line 20 in FIG. 2. In a first preferred mode of this process, the frequencies at the stepping point of each level are specified as approximately $f_0=5$, $f_1=20$, $f_2=40$, $f_3=60$, and $f_4=80$, $f_5=100$, $f_6=120$, $f_7=140$, $f_8=160$, $f_9=180$, and $f_{10}=200$ Hz. This assumption set may be modified for simulating vibration for an engine mounted component. The levels of the composite PSD ($PSD_1$, $PSD_2$, ... to $PSD_{10}$) are determined by the weighted average (energy equivalence) as follows:

$$PSD_j(f) = \frac{\Sigma_i \frac{Mf_{g,i}}{v_i} \int_{f_{j-1}}^{f_j} PSD_{g,i}(f) df}{(f_j - f_{j-1}) \Sigma_i \frac{Mf_{g,i}}{v_i}} \quad j = 1, 2, \ldots 10 \quad (7)$$

where the average frequency $f_{g,i}$ is calculated according to the following Equation:

$$f_{g,i} = \sqrt{\frac{\int_{f_{min}}^{f_{max}} f^2 PSD_{g,i}(f) H^2(f) df}{\int_{f_{min}}^{f_{max}} PSD_{g,i}(f) H^2(f) df}} \quad (8)$$

The composite PSD of Equation 7 can also be written as follows:

$$PSD_T(f) = \begin{cases} a_1 AF PSD_p & 5Hz < f < 20Hz \\ a_1 AF PSD_p & 20(j-1)Hz < f < 20(j)Hz \end{cases} \quad j = 2,3,\ldots 10 \quad (9)$$

where the $PSD_p$ is the highest level of the PSD block calculated according to Equation 7, and the scaling coefficient $a_j$ is the ratio of $PSD_j$ and highest level of PSD block, $PSD_p$, determined according to Equation 7.

(iii) Determine the shape of the laboratory test profile and amplification factor In order to insure that the input energy distribution (in the frequency domain) of the test is similar to what will be encountered in the field, the shape of the laboratory test PSD is determined according to the shape or profile of the simplified composite PSD curve. A simple way to do this is to connect the top of the step function (see FIG. 3). The lab test PSD will be accelerated by multiply this PSD curve with an amplification factor FA as follows:

$$PSD_i(f) = AF \, PSD_j(f) \quad (10)$$

The amplification factor in Equation. 9 can be calculated based on the material damage property, and the stress response function.

(iv) Calculate the stress response function

The stress response function H(f) of the product is obtained from a dynamic stress analysis by using CAE tools, such as the ABAQUS finite element analysis software tool as licensed by Hibbitt, Karlsson and Sorensen, Inc., 1080 Main Street, Pawtucket, R.I. This stress response curve H(f) is the transmissibility function from the input vibration acceleration forces to the local vibration stress. The resulting data file for H(f) is a list of H values for selected frequencies, on the product being tested, and will be used in the determination of test loading levels in the next steps.

(v) Specify the required test duration

The test duration may be specified based on the capability of testing equipment and the testing time available. When formulating an efficient testing protocol, short testing time are preferred. However, from an accuracy perspective, as more test time is included, the test simulates the field acceleration more accurately. This is true because the reduced testing time requires higher acceleration force levels, or a high amplification factor, which may cause product failure mechanism shift or which the testing equipment may not be able to generate.

Figure 4:
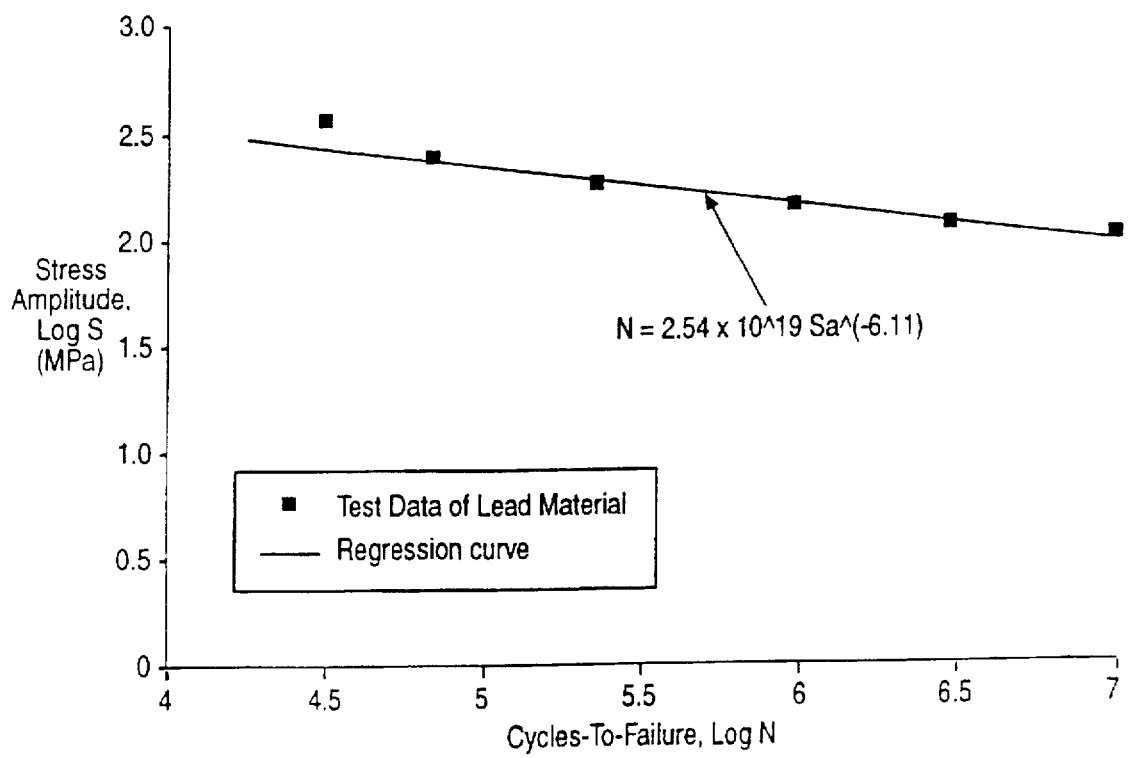
FIG. 4 illustrates an example of the stress-frequency response curve with unit acceleration at the critical point.

Substituting the stress frequency response curve H(f) as calculated in the previous step, such as the one illustrated in FIG. 4, into Equation 6, together with Equations 8 and 9, the relationship between the amplification factor AF and the desired test duration T (in hours), can be determined as follows:

$$T = \frac{\Sigma M_i/v_i \left\{ \int_{f_{min}}^{f_{max}} PSD_{g,i}(f) H^2(f) df \right\}^{-\frac{m}{2}}}{\left\{ AF \int_{f_{min}}^{f_{max}} PSD_j(f) H^2(f) df \right\}^{-\frac{m}{2}}} \quad (11)$$

This equation provides solutions for the PSD(f) as a function of test duration T. A comprehensive judgement then can be made based on testing time available, test machine capability, and concerns over failure mechanism shift. In general, 6 to 14 hours are recommended, but as few as 4 and as many as 24 hours may be required by the particular testing requirements. In the preferred mode of the present method, 8 hours are deemed the preferred test duration.

(vi) Specify the loading level

Once the test duration is determined in step (v) above, the PSD level of the vibration test input can then be calculated as follows:

$$PSD_T(f) = \begin{cases} a_1 AF PSD_p & 5Hz < f < 20Hz \\ a_1 AF PSD_p & 20(j-1)Hz < f < 20(j)Hz \end{cases} \quad j = 2,3,\ldots 10 \quad (12)$$

where the value of AF is calculated as follows:

$$AF = \frac{\Sigma M_i/v_i \int_{f_{min}}^{f_{max}} PSD_{g,i}(f) H^2(f) df}{\int_{f_{min}}^{f_{max}} PSD_j(f) H^2(f) df} T^{-\frac{2}{m}} \quad (13)$$

The laboratory testing equipment is set up for the chosen acceleration levels over the prescribed frequency ranges.

(vii) Run the laboratory testing

The laboratory accelerated testing is then performed using the selected test duration and calculated $PSD_T(f)$. If no failures are observed during the testing period T, then the proposed design for the product should not fail in field operation during the expected lifetime of the product.

If the product fails before the laboratory testing period T is complete, then laboratory testing must be extended and additional failures determined from either an extended testing duration or an enlarged sample size for testing.

A method for determining the additional testing required and the success or failure of the laboratory testing is disclosed in my copending patent application Ser. No. 08/543, 418, filed Oct. 16, 1995, and entitled "Method to Reduce Sample Size In Accelerated Reliability Verification Tests", which is incorporated herein by reference. According to this method, either a reduced sample size of products may be tested for a predetermined number of testing cycles, or a standard sample size may be tested for a reduced number of testing cycles. Either of these accelerated tests will result in the successful validation of the reliability for the product design with a confidence level exceeding that required for the accelerated testing.

The method for determining a sample size W required for accelerated testing may be summarized as including the steps of:

(a) selecting a Reliability Goal R as appropriate for the product, (b) selecting a Confidence Level CL appropriate for the accuracy required from the results of the accelerated testing, (c) selecting the number of testing cycles $N_t$ defining the accelerated testing period, (d) calculating the Sample Size W for the accelerated testing as $$W = \frac{Log(1-CL)}{LogR(N_t)}$$

where $R(N_t)$ is the reliability function, and (e) testing the W product samples for the $N_t$ testing cycles to validate the required Reliability when no test failures are observed over the $N_t$ testing cycles.

A similar method for determining the Number of Cycles $N_t$ required for accelerated testing of a product may be summarized as including the steps:

(a) selecting a Reliability Goal R as appropriate for the product, (b) selecting a Confidence Level CL appropriate for the accuracy required from the accelerated testing, (c) selecting the number of product samples for the Sample Size W, (d) calculating the Number of Cycles $N_t$ for the accelerated testing as $$N_t = R^{-1}\left\{\sqrt[W]{1-CL}\right\}$$

where $R^{-1}$ is the inverse function of $R(n)$, and (e) testing the W product samples for the $N_t$ testing cycles to validate the required Reliability when no test failures are observed over the $N_t$ testing cycles.

In either of the above methods, if any failures are observed in the $N_t$ testing cycles, then the number of testing cycles may be extended to at least $2 N_t$ and a new Confidence Level is calculated as:

$$CL_{NEW} = 1 - \sum_{x=0}^{NF} \frac{W!}{x!(W-x)!} [1-R(2N_t)]^x R(2N_t)^{w-x}$$

where NF is the number of failed products within $2N_t$ cycles. The Reliability R for the product design is validated if the new Confidence Levels $CL_{NEW}$ is greater than a $CL_{min}$ value specified as a minimum confidence level required for the accelerated testing method.

If the product comprises several different materials, and a failure occurs in the expected material (with material property of m) before T hours, a design change or manufacturing improvement is required. If a failure occurs in an unexpected material (with different material property m') before the testing duration of T hours, then the required test duration T' must be recalculated using new property m' of the material associated with the failure. The testing must be initiated again in order to determine if the product can successfully operate for the newly calculated duration requirement T'.

Instrument Cluster Example

Figure 5:
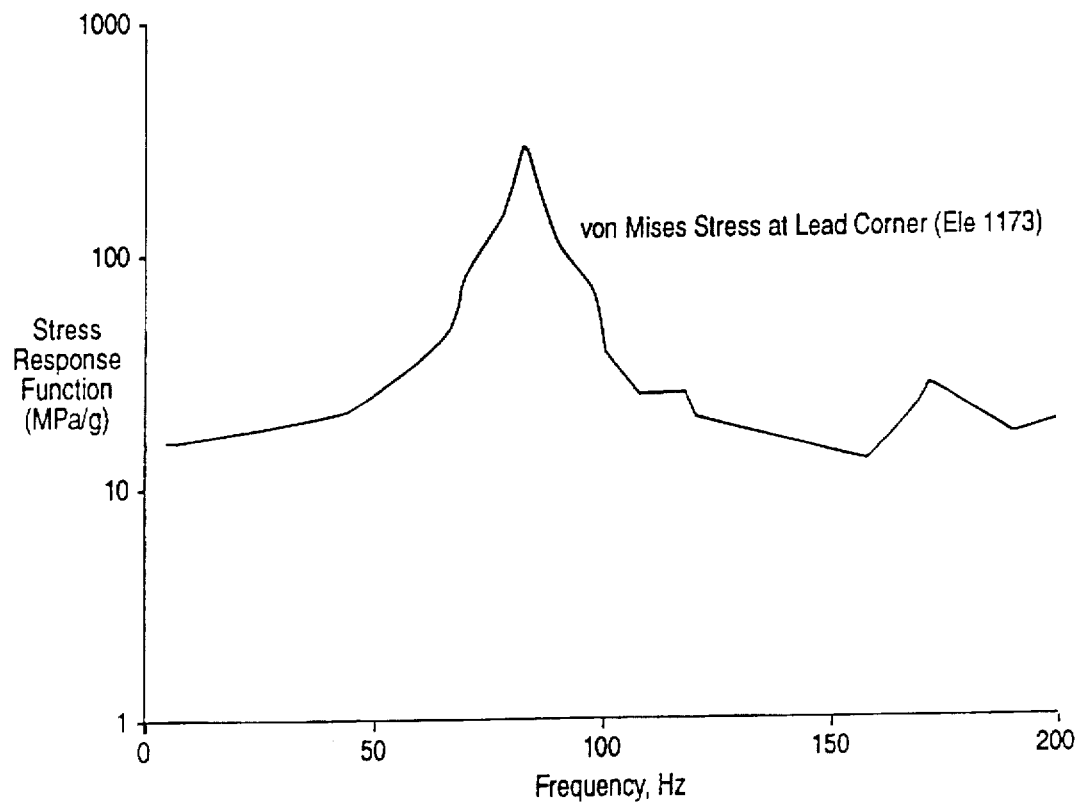
FIG. 5 is a plot of measured material damage properties of electronic component leads.

In this section, an automation instrument cluster is used as an example to illustrate the application of the accelerated durability testing process described above. The instrument cluster consists of a plastic box, a Printed Wiring Board (PWB), and several heavy display components with insertion leads. The potential failure mechanism of concern is the fatigue due to vibration at the lower corner of the component insertion leads. The relationship between stress amplitude S and cycles to failure of the lead material is determined from material fatigue testing shown in FIG. 5 and the regression curve of the test data can be expressed as follows:

$$N = 2.54 \times 10^{19} S_A^{-6.11}$$

FIG. 1 shows seven PSD curves measured at the instrument panel of a light truck driven on seven road surfaces during actual field testing. The average driving speed, the required driving distance, and the driving time are listed in Table 1. This proving ground driving test may be considered to be equivalent to customer usage of the light truck for 150,000 miles. Based on the seven PSD curves and the information listed in Table 1, the composite PSD curve is determined according to Equation 7. The dark curve 20 in FIG. 2 is the composite PSD curve which will be used to determine the test acceleration level. From the composite PSD curve, the constants $a_j$ that determine the shape of laboratory test profile are calculated as shown in Table 2. The resulting PSD curve by connecting the composite PSD step curves are shown in FIG. 3.

Figure 6:
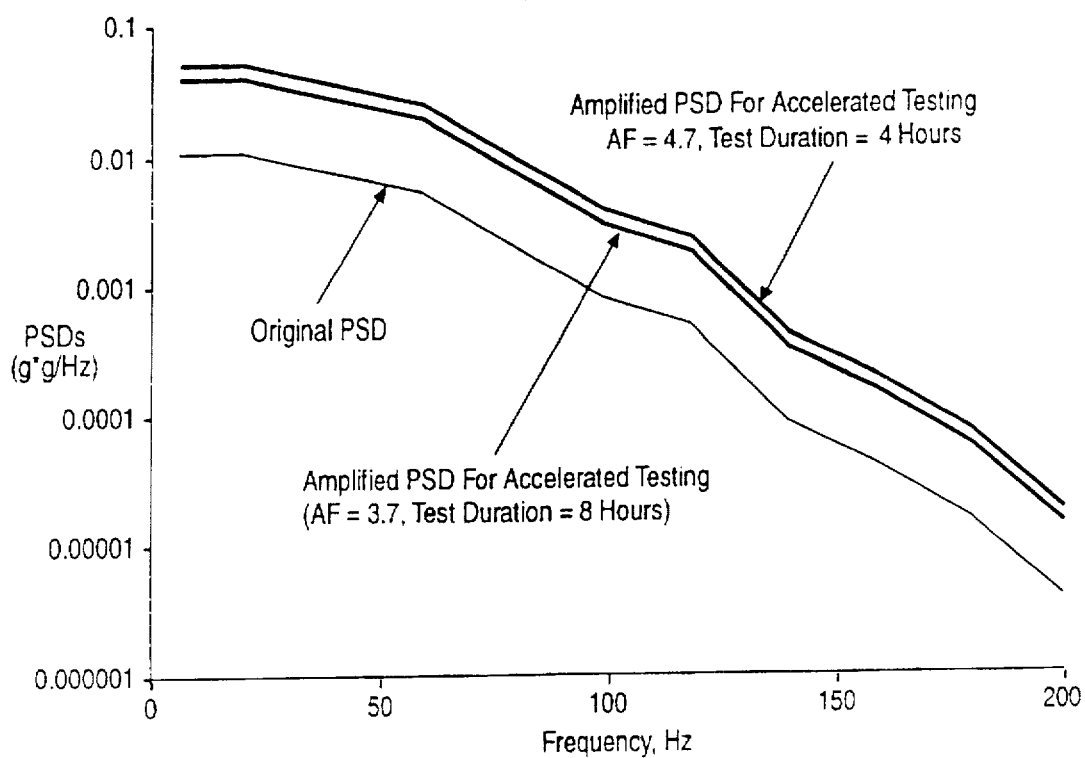
FIG. 6 illustrates an example of the laboratory random vibration level for selected test duration T.

The dynamic vibrational stress analysis is performed using the finite element method. The stress response curve H(f) at the root of the lead is obtained and plotted in FIG. 4. Substituting the stress response curve and the material property m=6.11 (given by Equation 14) into Equation 13, the relationship between the amplification factor as well as the test PSD curves are calculated as shown in FIG. 6. If T=8 hours is selected as a compromise between too short and too long, the amplification factor is calculated as 3.7 according to Equation 13, which gives the PSD curve as shown in FIG. 6. Since the testing time for each axis is 8 hours, the total testing time is 24 hours for three axis testing. If a shorter testing period, T=4 hours is required, then the amplification factor is calculated as 4.7 according to Equation 13. Since the testing time for each axis is 8 hours, the total testing time is 12 hours for three axis testing.

TABLE 1

Field Road Load Conditions (150,000 Miles Equivalent)

| Road Condition | Average Driving Speed (MPH) | Driving Distance (Mile) | Driving Time and Percentage (Hour, %) |
| --- | --- | --- | --- |
| 1. Power Hop Hill | 27 | 173 | 6.4, 1.38 |
| 2. Silver Creek | 20 | 2074 | 103.7, 22.3 |
| 3. Pot Holes | 12 | 23 | 1.9, 0.4 |
| 4. Cobble Stones (A.D.) | 27 | 1008 | 37.3, 8.0 |
| 5. Undulating Road (A.D.) | 27 | 992 | 36.7, 7.9 |
| 6. Wash Board (A.D.) | 27 | 611 | 22.6, 4.9 |
| 7. Others | 57 | 14559 | 255.4, 55 |
| Total | | 19440 | 464, 100 |

TABLE 2

| | Calculated Scaling Coefficients | | | | | | | | | |
|---|---|---|---|---|---|---|---|---|---|---|
| f range | 5–20 | 20–40 | 40–60 | 60–80 | 80–100 | 100–120 | 120–140 | 140–160 | 160–180 | 180–200 |
| $a_j$ | 1 | 0.7 | 0.5 | 0.2 | 0.08 | 0.05 | 0.01 | .005 | .002 | 5e–4 |

In summary, the laboratory test requirement to insure product durability is dependent on the geometry of the product and the material associated with the expected failure mode. The required vibration level for a given test time, or the required test time for a given vibration level, can be accurately determined for a product with known geometry, provided that the structural transmissibility can be calculated and that the material properties are known. A correct vibration specification can be developed based on the damage equivalence technique according to the vehicle miles/speed and the PSD curves measured at the vehicle zone in which the product will be mounted for actual customer usage profiles. If the geometry and material properties are unknown, conservative engineering assumptions may be used for making the accelerated testing generally independent of these functions. Using this method, it may be possible to simulate 150,000 miles of driving in only 24 hours of accelerated three axis laboratory vibration testing.

Figure 7:
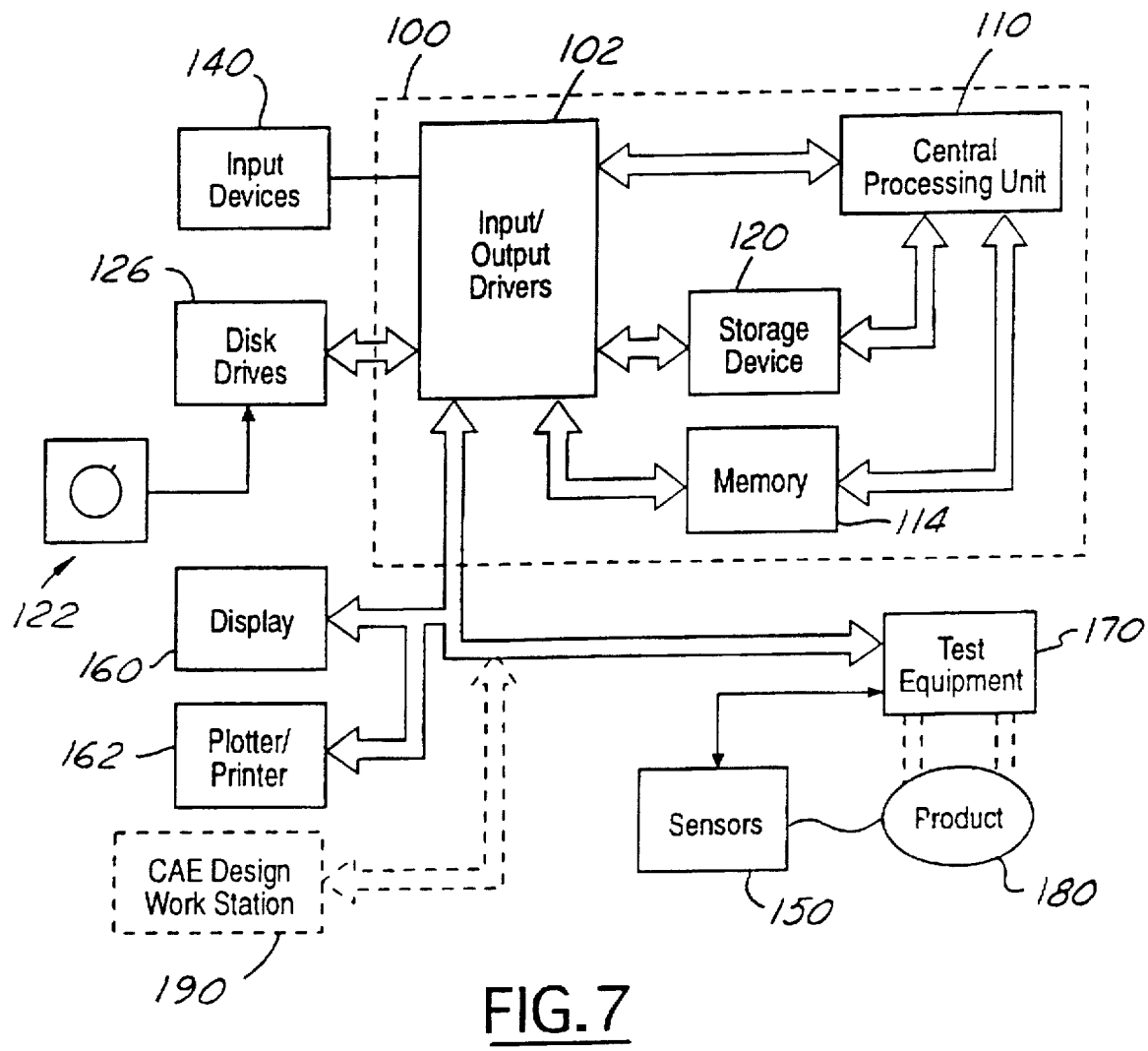
FIG. 7 illustrates a schematic block diagram of a computer and testing system for executing the testing method in accordance with the present invention.

The method in accordance with the present invention may be implemented either on a special purpose computer/microcontroller or on the general purpose computer which is illustrated generally as 100 in FIG. 7. The computer 100 includes input/output driver circuitry 102 that receives data from input devices 140 and sensors 150. An example of input device 140 would be a computer keyboard, while an example of the sensors 150 would include voltage sensors, vibration sensors, strain gauges, accelerometers, load cells, torque sensors, etc. The input/output drivers 102 are coupled to a central processing unit (CPU) 110 that performs calculations and other steps in accordance with the method described herein. An example of a CPU used for the present invention would be a PA-RISC 7200 processor from Hewlett-Packard Company, Palo Alto, Calif. The program that directs the central processing unit 110 may be written in the "C" language. This program is stored within a storage device 120, that may comprise a hard drive, a floppy drive, non-volatile memory or some other storage medium capable of recording and playing back algorithms and computer programs in accordance with the present invention. The storage system 120 also may include various physical parameters, distributions, materials data bases, load (environmental or road load) data bases, physical characterizations, etc., that are required during the execution of the computer program, and which may be stored and retrieved most efficiently on the storage device 120. The central processing unit 110 also is coupled to sufficient memory 114 for receiving and storing selected portions of the computer program and data being operated upon by the central processing unit 110.

Other outputs of the input/output drivers 102 may be coupled to a system display 160, such as a CRT display, a platter or printer 162 and to test equipment 170 that operates upon the product being tested 180. The test equipment 170 may respond directly to commands from the computer 100 as required to specify the frequency distribution, amplitude, voltages, etc., in order to control the testing on the product 180. Examples of test equipment 170 include load amplifiers, shaker tables, exciter controllers, recorders, conditioning amplifiers, measuring amplifiers, and force transducers. As previously discussed, multiple sensors 150 may be coupled either directly to the product 180 (such as voltage sensors, strain gauges, accelerometers, load cells, torque sensors) or the sensors 150 may be coupled, either directly or indirectly, to the test equipment 170 (such as position sensors, strain gauges or other similar sensors) if such sensors are not included in the test equipment itself.

The method in accordance with the present invention may be completely automated on a general purpose computer, such as the one illustrated in FIG. 7, or may be partially implemented through operator control of the test equipment and sensors in accordance with information and instructions illustrated on the display 160. Various alphanumeric inputs may be entered through the input device 140 or through various storage media 122, preferably easily transportable media. Examples of such storage media 122 include magnetic floppy disks, magnetic tapes and optical disks that may be read through compatible drives in the storage system 121, that in turn are coupled to either the input/output drivers 102 or directly to the storage device 120. Either the method or program in accordance with the present invention, or various data necessary for running the program, or both, may be stored upon and distributed by means of the magnetic storage medium 122.

It also may be possible to couple the output of a Computer Aided Design Engineering (CAE) workstation 190 to either the input device 140 or directly to the input/output drivers 102 of the computer 100. In this manner, CAE workstation designs, rather than actual prototype testing data, may be fed directly into the computer 100 for analysis and testing in accordance with the method of the present invention. In a similar manner, it may also be possible to couple the input/output drivers 102 directly to the CAE workstation so that results of the testing and analysis may be coupled directly to the product design being developed in the CAE workstation so that appropriate product design parameters may be adjusted in accordance with the test results.

It also may be possible to simulate the accelerated testing methodology on the CAE workstation 190 using finite element analysis and durability analysis techniques rather than building a prototype and testing it on the test equipment 170 and with the sensors 150 as discussed above. This simulation testing may be accomplished either on the computer 100, or a computer program in accordance with the teachings of the present invention may be incorporated as a module into the software used in the CAE workstation to design and analyze the product. Under these circumstances, the computer program in accordance with the present invention would probably be executed directly upon the CAE workstation 190.

Figure 8:
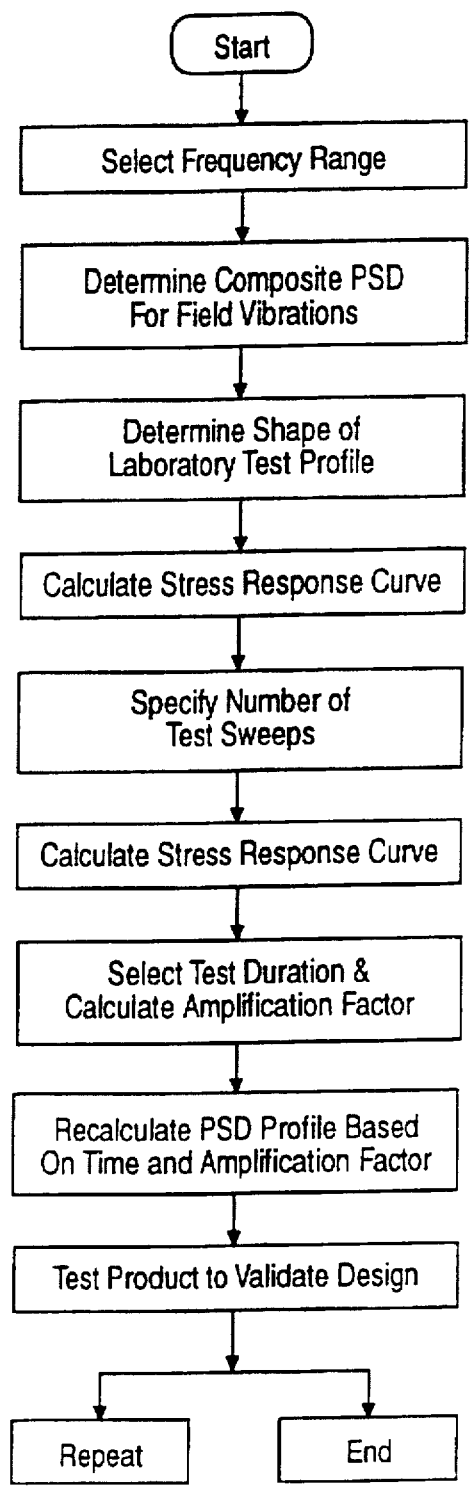
FIG. 8 is a flow diagram for a computer program in accordance with the present invention.

A logic flow diagram for implementing the method in accordance with the present invention on a computer is illustrated in FIG. 8.

While the best mode of the method has been described in detail, one skilled in this art will be capable of numerous variations, modifications and adaptations without departing from the spirit and scope of the present invention. It should be understood that the present invention is not limited to the processes, embodiments or examples contained herein, but are limited only by the scope of the following claims.

I claim:

1. A method for determining the testing profile for accelerated laboratory random vibrational testing of a product, the method comprising the steps of:

(i) selecting the frequency range covered in the lab accelerated testing, (ii) developing a simplified composite Power Spectral Density function $PSD_j(f)$, including scaling coefficients, representative of the Power Spectral Density PSD for random vibration loadings in expected field vibration levels.

(iii) developing the shape of Composite Power Spectral Density Curves $PSD_T$ by using the scaling coefficients, for producing on the product the test acceleration forces corresponding to the $PSD_j$ function, (iv) calculating the stress response curve H(f) for the product representative of the transmissibility function from the test acceleration forces to the local vibration stress forces, (v) selecting the test duration based on the capabilities of the testing equipment and the testing time available, and then calculating the amplification factor AF from the relationship $$AF = \frac{\Sigma M_i / v_i \int_{f_{min}}^{f_{max}} PSD_{g,i}(f) H^2(f) df}{\int_{f_{min}}^{f_{max}} PSD_j(f) H^2(f) df} T^{\frac{2}{m}}$$

(vi) recalculating the accelerated PSD profile, $PSD_T(f)$ for testing based on the selected test duration and the amplification factor:

$$PSD_T(f) = \begin{cases} a_1 AFPSD_p & 5Hz < f < 20Hz \\ a_1 AFPSD_p & 20(j-1)Hz < f < 20(j)Hz \end{cases} \quad j = 2,3,\ldots 10$$

and then (vii) testing the product using the selected PSD function to validate the required performance lifetime for the product when no test failures are observed over the T hours.

2. The accelerated testing method as described in claim 1, further comprising the step of:

(viii) redesigning the product to eliminate the root cause of failures observed in the T hours of test.

3. The accelerated testing method as described in claim 1, further comprising the step of:

(ix) testing an enlarged sample size of the product samples for T hours of the test after the failure of the first product test to determine if the failure was statistically significant.

4. The accelerated testing method as described in claim 1, wherein step (i) includes the substep:

(i1) redesigning the product, or related manufacturing process, to eliminate the root cause of failure observed in the T hours of test in a product material, having material property m, in which the expected failure mode occurs.

5. The accelerated testing method as described in claim 1, wherein step (i) includes the substep:

(i2) recalculating the required test duration of T' hours using material property m' after a failure occurs in an unexpected material, having the material property m', before the testing of T' hours is completed, and (i3) retesting the product for the T' hours.

6. The accelerated testing method as described in claim 1, wherein step (ii) includes the substeps of constructing a Power Spectral Density PSD including multiple spectral bandwidths such that $$PSD_j = \frac{\Sigma_i \frac{Mf_{g,i}}{v_i} \int_{f_{j-1}}^{f_j} PSD_{g,i}(f) df}{(f_j - f_{j-1}) \Sigma_i \frac{Mf_{g,i}}{v_i}} \quad j = 1, 2, \ldots 10$$

which is then simplified to $$PSD_T(f) = \begin{cases} a_1 AFPSD_p & 5Hz < f < 20Hz \\ a_1 AFPSD_p & 20(j-1)Hz < f < 20(j)Hz \end{cases} \quad j = 2,3,\ldots 10$$

Wherein $a_j$ are scaling coefficients.

7. The accelerated testing method as described in claim 1, wherein step (ii) includes the substeps of selecting the frequencies at the stepping point of each level in accordance with: $f_0$ as approximately 5 Hz, $f_1$ as approximately 20 Hz, $f_2$ as approximately 40 Hz, $f_3$ as approximately 60 Hz, $f_4$ as approximately 80 Hz, $f_5$ as approximately 100 Hz, $f_6$ as approximately 120 Hz, $f_7$ as approximately 140 Hz, $f_8$ as approximately 160 Hz, $f_9$ as approximately 180 Hz, and $f_{10}$ as approximately 200 Hz.

8. The accelerated testing method as described in claim 1, wherein step (iii) includes the substep of developing the composite PSD, $PSD_j(f)$, to correlate with the frequency range $f_j$ to $f_{j+1}$ (j=1,2, . . . 10) as well as the scaling coefficients $a_j$ (j=1, 2, . . . 10) and interpolating between the points of the composite PSD, $PSD_j(f)$, to develop a smooth curve as the shape of the $PSD_T(f)$.

9. The accelerated testing method as described in claim 1, wherein step (iii) includes the substep of defining composite Power Spectral Density $PSD_T$ (f) as $$PSD_T(f) = \begin{cases} a_1 AFPSD_p & 5Hz < f < 20Hz \\ a_1 AFPSD_p & 20(j-1)Hz < f < 20(j)Hz \end{cases} \quad j = 2,3,\ldots 10$$

10. The accelerated testing method as described in claim 1, wherein step (v) includes the substep of selecting test duration T from the range of approximately 4 hours to 24 hours.

11. The accelerated testing method as described in claim 10, wherein step (v) includes the substep of selecting test duration T of 8 hours.

12. A method for determining the testing profile for accelerated laboratory random vibrational testing of a product, the method comprising the steps of:

(i) selecting the frequency range of 5 Hz to 200 Hz.

(ii) developing a simplified composite Power Spectral Density function $PSD_j(f)$, including scaling coefficients, representative of the PSD for random vibration loadings in expected field vibration levels, (iii) developing the shape of $PSD_T$ by using approximately ten scaling coefficients, for producing on the product the test acceleration forces corresponding to the $PSD_j$ function, (iv) calculating the stress response curve H(f) for the product representative of the transmissibility function from the input acceleration forces to the local vibration stress forces, (v) selecting the test duration based on the capabilities of the testing equipment and the testing time available, and then calculating the amplification factor AF from the relationship $$AF = \frac{\Sigma M_i/v_i \int_{f_{min}}^{f_{max}} PSD_{g,i}(f)\, H^2(f)\, df}{\int_{f_{min}}^{f_{max}} PSD_j(f)\, H^2(f)\, df} \; T^{\frac{2}{m}}$$

(vi) recalculating the accelerated PSD profile, $PSD_T(f)$ for testing based on the selected test duration and the amplification factor:

$$PSD_T(f) = \begin{cases} a_1 AFPSD_p & 5Hz < f < 20Hz \\ a_1 AFPSD_p & 20(j-1)Hz < f < 20(j)Hz \end{cases} \quad j = 2,3,\ldots 10$$

and then
(vii) testing the product using the selected PSD function to validate the required performance lifetime for the product when no test failures are observed over all of the T hours.

13. The accelerated testing method as described in claim 12, further comprising the step of:
(viii) redesigning the product to eliminate the root cause of failures observed in the T hours of test.

14. The accelerated testing method as described in claim 12, further comprising the step of:
(ix) testing an enlarged sample size of the product samples for T hours of the test after the failure of the first product test to determine if the failure was statistically significant.

15. The accelerated testing method as described in claim 12, wherein step (i) includes the substep:
(i1) redesigning the product, or related manufacturing process, to eliminate the root cause of failure observed in the T hours of test in a product material, having material property m, in which the expected failure mode occurs.

16. The accelerated testing method as described in claim 12, wherein step (i) includes the substeps:
(i2) recalculating the required test duration of T hours using material property m' after a failure occurs in an unexpected material, having the material property m', before the testing of T' hours is completed, and (i3) retesting the product for the T' hours.

17. The accelerated testing method as described in claim 12, wherein step (ii) includes the substeps of constructing a Composite Power Spectral Density PSD including approximately ten spectral bandwidths such that $$PSD_j = \frac{\Sigma_i \frac{Mf_{g,i}}{v_i} \int_{f_{j-1}}^{f_j} PSD_{g,i}(f)\, df}{(f_j f_{j-1})\, \Sigma_i \frac{Mf_{g,i}}{v_i}} \quad j = 1, 2, \ldots 10$$

which is then simplified to $$PSD_T(f) = \begin{cases} a_1 AFPSD_p & 5Hz < f < 20Hz \\ a_1 AFPSD_p & 20(j-1)Hz < f < 20(j)Hz \end{cases} \quad j = 2,3,\ldots 10$$

wherein $a_j$ are scaling coefficients.

18. The accelerated testing method as described in claim 12, wherein step (ii) includes the substeps of selecting the frequencies at the stepping point of each level in accordance with: $f_0$ as approximately 5 Hz, $f_1$ as approximately 20 Hz, $f_2$ as approximately 40 Hz, $f_3$ as approximately 60 Hz, $f_4$ as approximately 80 Hz, $f_5$ as approximately 100 Hz, $f_6$ as approximately 120 Hz, $f_7$ as approximately 140 Hz, $f_8$ as approximately 160 Hz, $f_9$ as approximately 180 Hz, and $f_{10}$ as approximately 200 Hz.

19. The accelerated testing method as described in claim 12, wherein step (iii) includes the substep of developing the composite PSD, $PSD_j(f)$, to correlate with the frequency range $f_j$ to $f_{j+1}$ (j=1,2, . . . 10) as well as the scaling coefficients $a_j$ (j=1,2, . . . 10) and interpolating between the points of the composite PSD, $PSD_j(f)$, to develop a smooth curve as the shape of the $PSD_T(f)$.

20. The accelerated testing method as described in claim 12, wherein step (iii) includes the substep of defining Composite Power Spectral Density curves $PSD_T(f)$ as $$PSD_T(f) = \begin{cases} a_1 AFPSD_p & 5Hz < f < 20Hz \\ a_1 AFPSD_p & 20(j-1)Hz < f < 20(j)Hz \end{cases} \quad j = 2,3,\ldots 10$$

* * * * *